US010376870B2

(12) United States Patent
Shinoda et al.

(10) Patent No.: US 10,376,870 B2
(45) Date of Patent: Aug. 13, 2019

(54) CATALYST BLOCK

(71) Applicant: NIPPON STEEL & SUMIKIN MATERIALS CO., LTD., Tokyo (JP)

(72) Inventors: Takeshi Shinoda, Tokyo (JP); Hidehiko Morita, Tokyo (JP); Masayuki Kasuya, Tokyo (JP); Taro Kono, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 0 days.

(21) Appl. No.: 15/738,368

(22) PCT Filed: Oct. 14, 2015

(86) PCT No.: PCT/JP2015/079007

§ 371 (c)(1),
(2) Date: Dec. 20, 2017

(87) PCT Pub. No.: WO2017/064762

PCT Pub. Date: Apr. 20, 2017

(65) Prior Publication Data

US 2018/0161766 A1 Jun. 14, 2018

(51) Int. Cl.

*B01J 35/04* (2006.01)
*B01D 53/86* (2006.01)

(Continued)

(52) U.S. Cl.

CPC .......... *B01J 35/04* (2013.01); *B01D 53/8631* (2013.01); *F01N 3/2066* (2013.01); *F01N 3/281* (2013.01);

(Continued)

(58) Field of Classification Search

CPC ... B01D 53/8631; F01N 3/2066; F01N 3/281; F01N 2330/02; B01J 35/04

(Continued)

(56) References Cited

U.S. PATENT DOCUMENTS 4,849,185 A * 7/1989 Wittig .................... B01D 53/86 422/171
4,916,001 A 4/1990 Whittenberger et al.

(Continued)

FOREIGN PATENT DOCUMENTS

CN 101486002 A * 7/2009
JP H01-218636 A 8/1989

(Continued)

OTHER PUBLICATIONS

PCT/ISA/210, "International Search Report for International Application No. PCT/JP2015/079007," dated Jan. 19, 2016.

(Continued)

*Primary Examiner* — Tom P Duong

(74) *Attorney, Agent, or Firm* — Manabu Kanesaka

(57) ABSTRACT

Provided is a catalyst block for cleaning exhaust gas, having: a square-shaped honeycomb core provided with first-fourth outside surfaces; a first plate attached to the first outside surface; a second plate attached to the second outside surface; and an exterior frame disposed along the outer periphery of the firm and solid honeycomb core formed from the honeycomb core, the first plate and the second plate, the exterior frame being provided with a recessed part that at least encases the first plate, the second plate, the third outside surface and the fourth outside surface. In the catalyst block, a catalyst is supported in the honeycomb core, the first plate and the second plate, and the catalyst is not supported in the exterior frame.

16 Claims, 8 Drawing Sheets

(51) Int. Cl.
*F01N 3/20* (2006.01)
*F01N 3/28* (2006.01)

(52) U.S. Cl.
CPC ...... *B01D 2255/90* (2013.01); *F01N 2330/02* (2013.01); *F01N 2330/04* (2013.01); *F01N 2450/02* (2013.01); *F01N 2450/30* (2013.01)

(58) Field of Classification Search
USPC .................................................. 422/180, 177
See application file for complete search history.

(56) References Cited

U.S. PATENT DOCUMENTS

| | | | | |
|---|---|---|---|---|
| 5,278,125 | A * | 1/1994 | Iida .......................... | B01J 35/04 428/116 |
| 5,403,558 | A * | 4/1995 | Kono ....................... | B01J 35/04 422/179 |
| 5,436,216 | A | 7/1995 | Toyao et al. | |
| 6,080,371 | A * | 6/2000 | Tanabe ..................... | B01J 35/04 422/177 |
| 7,404,254 | B2 | 7/2008 | Kurth et al. | |
| 7,943,096 | B2 | 5/2011 | Kurth et al. | |

FOREIGN PATENT DOCUMENTS

| | | | |
|---|---|---|---|
| JP | H06-126191 | A | 5/1994 |
| JP | H06-154555 | A | 6/1994 |
| JP | H07-171410 | A | 7/1995 |
| JP | H08-229410 | A | 9/1996 |
| JP | H08-266907 | A | 10/1996 |
| JP | 2001-225130 | A | 8/2001 |
| WO | 03/087549 | A1 | 10/2003 |

OTHER PUBLICATIONS

Japan Patent Office, "Office Action for Japanese Patent Application No. 2017-545028," dated Nov. 21, 2017.
PCT/IB/338, "Notification of Transmittal of Translation of the International Preliminary Report on Patentability for International Application No. PCT/JP2015/079007," dated Apr. 26, 2018.
PCT/IB/373, "International Preliminary Report on Patentability for International Application No. PCT/JP2015/079007," dated Apr. 17, 2018.
PCT/ISA/237, "Written Opinion of the International Searching Authority for International Application No. PCT/JP2015/079007," dated Jan. 19, 2016.
Europe Patent Office, "Search Report for European Patent Application No. 15906226.4," dated Dec. 7, 2018.

* cited by examiner

CATALYST BLOCK

RELATED APPLICATONS

The present application is National Stage of International Application No. PCT/JP2015/079007 filed Oct. 14, 2015, the disclosure of which hereby incorporated by reference herein in its entirety.

TECHNICAL FIELD

The present invention relates to a catalyst block for purifying exhaust gas and a method for manufacturing the same.

BACKGROUND ART

Exhaust gas generated from various types of stationary combustion devices such as a boiler, a private power generator, and a combustion furnace, and metal etching contains a nitrogen oxide (NOx). The nitrogen oxide (NOx) is a substance causing photochemical smog. For this reason, it is necessary that the nitrogen oxide be purified by a denitration device.

Such a denitration device has a denitration catalyst layer in which many catalyst blocks are spread. FIG. 11 is a schematic view of a conventional catalyst block as viewed in a gas flow direction. With reference to FIG. 11, a block for a catalyst 100 is configured so that a rectangular honeycomb core 101 in which a corrugated plate and a flat plate are alternately layered is enclosed in an outer frame 102.

The outer frame 102 is constituted by a C-shaped frame 102*a* and a top frame 102*b*. As shown in FIG. 12 that shows a Z1-Z2 cross section of the catalyst block, the C-shaped frame 102*a* has a clearance CL sufficient to insert the honeycomb body 101. The block for a catalyst 100 is immersed in a catalyst bath, and then baked. Thus, a catalyst is carried on the block for a catalyst 100.

As another conventional technique, Patent Literature 1 discloses a denitration catalyst layer in which catalyst blocks each having a frame body and a catalyst contained in the frame body are entirely spread and layered. In the denitration catalyst layer, a plate-shaped catalyst is attached to a circumference of the frame bodies of the catalyst blocks. This is a technique of removing a nitrogen oxide from exhaust gas flowing out from a gap formed between the catalyst blocks using the plate-shaped catalyst, to decrease NOx and the like at an outlet of the catalyst layer.

CITATION LIST

Patent Literature

Patent Literature 1: JPH6-154555

SUMMARY OF INVENTION

Technical Problem

However, the treatment temperature at which the block for a catalyst 100 is baked so as to be integrated with the honeycomb core 101 and the outer frame 102 is very high (about 1,200° C.). Therefore, during baking of the block for a catalyst 100, the outer frame 102 may be thermally deformed to distort the shape of the block for a catalyst 100. When the shape of the block for a catalyst 100 is distorted, a gap is formed between the adjacent blocks for a catalyst 100 during spreading of the blocks for a catalyst 100. From the gap, exhaust gas flows out without denitration. Therefore, the denitration performance of the catalyst layer is deteriorated.

In order to suppress thermal deformation during baking, a method for forming a rib in the outer frame 102 to enhance the rigidity of the outer frame 102 is also considered. However, the cost is increased since it is necessary that the outer frame 102 be molded into a complicated shape. A method for immersing the honeycomb core 101 in a catalyst bath followed by sintering before housing of the honeycomb core 101 in the outer frame 102 is also considered. However, the shape of the honeycomb core may be distorted during operation of immersion in the catalyst bath or transport to the catalyst bath since the honeycomb core 101 made of a metal foil is fragile.

When the block for a catalyst 100 is immersed in the catalyst bath, the catalyst flows into the clearance CL of the C-shaped frame 102*a*. Thus, a catalyst CAT shown by black may be attached to the C-shaped frame 102*a*. In order to get the catalyst CAT away, a drain hole 102*a*1 is formed in the C-shaped frame 102*a*. However, the catalyst CAT attached to the C-shaped frame 102*a* cannot be all got away. Since exhaust gas does not flow into the C-shaped frame 102*a*, the catalyst may be unnecessarily used for a part different from an exhaust gas passage.

In the technique of Patent Literature 1, it is necessary that a plate-shaped catalyst be installed to purify exhaust gas flowing out from the gap formed between the catalyst blocks. Therefore, an operation for installation is complex and the cost is increased.

An object of the invention of the present application is to provide a catalyst block in which the distortion of the outer surface is small. Another object of the invention of the present application is to prevent a catalyst from being carried on a part that does not contribute to purification of exhaust gas. Further, an object of the invention of the present application is to make the maintenance of a catalyst block inexpensive. This is achieved by removing a honeycomb core from a spent catalyst block and easily exchanging a honeycomb core to which a catalyst is applied.

Solution to Problem

In order to solve the above-described problems, a catalyst block according to the invention of the present application is (1) a catalyst block for purification of exhaust gas including: a rectangular honeycomb core having a large number of exhaust gas passages for allowing exhaust gas to pass, first and second outer surfaces that face to each other in an orthogonal direction that is orthogonal to the exhaust gas passages, and third and fourth outer surfaces that face to each other in the orthogonal direction; a first plate attached to the first outer surface; a second plate attached to the second outer surface; and an outer frame that is disposed along an outer periphery of a rigid honeycomb core formed from the honeycomb core, the first plate, and the second plate, and includes a concave part capable of housing at least the first plate, the second plate, the third outer surface, and the fourth outer surface, wherein a catalyst is carried on the honeycomb core, the first plate, and the second plate carry, and the catalyst is not carried on the outer frame.

(2) In the configuration of (1) described above, the first plate is fixed in the concave part of the outer frame, and the second plate, the third outer surface, and the fourth outer surface may not be fixed in the concave part of the outer frame. According to the configuration of (2), a fixing part is limited to only the first plate. Therefore, deformation of the rigid honeycomb core into an abnormal shape or breakage by expansion and shrinkage due to temperature cycle can be prevented.

(3) In the configuration of (1) or (2) described above, the outer frame includes a bottom frame and a side frame that are integrally formed, and a top frame attached to the side frame, the first plate can be housed in the concave part of the top frame, the second plate can be housed in the concave part of the bottom frame, and the third outer surface and the fourth outer surface can be housed in the concave part of the side frame. According to the configuration of (3), the catalyst block can be maintained (for example, the catalyst is regenerated or reapplied or a novel honeycomb core is exchanged) by pulling out the top frame and the rigid honeycomb core that are integrated, from the outer frame.

(4) In the configuration of any one of (1) to (3) described above, the honeycomb core can be configured by alternately layering a flat foil and a corrugated foil in a direction in which the first outer surface and the second outer surface face to each other.

(5) In the configuration of any one of (1) to (4) described above, the first plate and the second plate can be formed from a ferrite-based stainless. According to the configuration of (5), while the first plate and the second plate are adsorbed by magnetic force, the rigid honeycomb core can be transported to a catalyst bath. Therefore, a load applied to the honeycomb core during transport can be decreased.

A method for manufacturing the catalyst block for purification of exhaust gas according to the invention of the present application is (6) a method for manufacturing a catalyst block for purification of exhaust gas that includes a rectangular honeycomb core having a large number of exhaust gas passages for allowing exhaust gas to pass, first and second outer surfaces that face to each other in an orthogonal direction that is orthogonal to the exhaust gas passages, and third and fourth outer surfaces that face to each other in the orthogonal direction, the method including: a fixation step of fixing the honeycomb core using a first plate and a second plate that are disposed on the first outer surface and the second outer surface, respectively, of the honeycomb core with the honeycomb core being held and pressurized; a first baking step of baking the honeycomb core, the first plate, and the second plate together with a brazing material to manufacture a rigid honeycomb core; a second baking step of applying a catalyst to the rigid honeycomb core and baking the rigid honeycomb core, causing the rigid honeycomb core to carry the catalyst; and a frame attachment step of inserting the first plate, the second plate, the third outer surface, and the fourth outer surface of the rigid honeycomb core carrying the catalyst into the concave part of the outer frame, to cover an outer periphery of the rigid honeycomb core with the outer frame.

(7) In the configuration of (6) described above, the outer frame includes a bottom frame and a side frame that are integrally formed, and a top frame, and the frame attachment step may include a step of fixing the first plate of the rigid honeycomb core in the concave part of the top frame; a step of inserting the rigid honeycomb core having the fixed top frame along the concave part of the side frame; and a step of fixing the top frame to the side frame.

(8) In the configuration of (6) or (7) described above, the first plate and the second plate are formed from a ferrite-based stainless. In the second baking step, the rigid honeycomb core is transported to and immersed in a catalyst bath in which the catalyst is pooled while the first plate and the second plate are adsorbed by a magnet, and then the rigid honeycomb core can be baked. According to the configuration of (8), a load applied to the honeycomb core during transport can be decreased.

Advantageous Effects of Invention

According to the present invention, for the outer frame of the catalyst block, a high-temperature baking treatment for integrating the honeycomb core and the outer frame and a baking treatment for carrying the catalyst on the honeycomb core are not performed. Therefore, the present invention can provide the outer frame with little distortion that is hardly influenced by thermal deformation. For this reason, the distortion of the outer surface of the catalyst block is decreased. Therefore, a gap from which exhaust gas flows out is unlikely to be formed between the adjacent catalyst blocks. Since the catalyst is not carried on the outer frame that does not contribute to purification of exhaust gas, the unnecessary amount of the catalyst can be decreased. Further, a honeycomb core part can be removed from a spent catalyst block. Therefore, exchanging of a honeycomb core to which a catalyst is newly applied is facilitated, and the maintenance of the catalyst block can be performed at low cost.

DESCRIPTION OF EMBODIMENTS

First Embodiment

Figure 1:
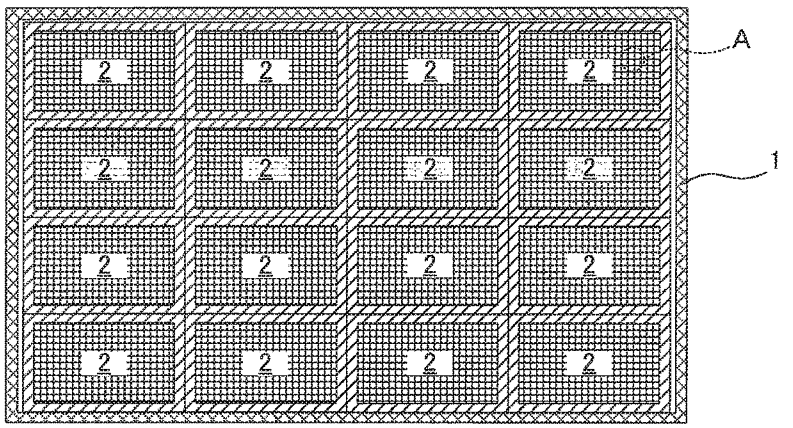
FIG. 1 is a schematic view of a denitration device.

One embodiment of the catalyst block of the present invention will be described with reference to the drawings. FIG. 1 is a schematic view of a denitration device. A normal direction of a sheet surface corresponds to a flow direction of exhaust gas (hereinafter referred to as gas flow direction). In an exhaust gas duct 1 of the denitration device, a large number of catalyst blocks 2 are spread. The catalyst blocks 2 are formed in a rectangular shape, and laminated in a large number of layers. Since an outer surface of each of the catalyst blocks 2 is formed flat, the catalyst blocks 2 are each closely adhered to an adjacent catalyst block 2, and in a structure thereof, a gap is unlikely to be formed. Therefore, the amount of exhaust gas that is not denitrated and passes through a gap formed between the adjacent catalyst blocks 2 can be decreased. A method for making the outer surface of each of the catalyst blocks 2 flat will be described.

Figure 2:
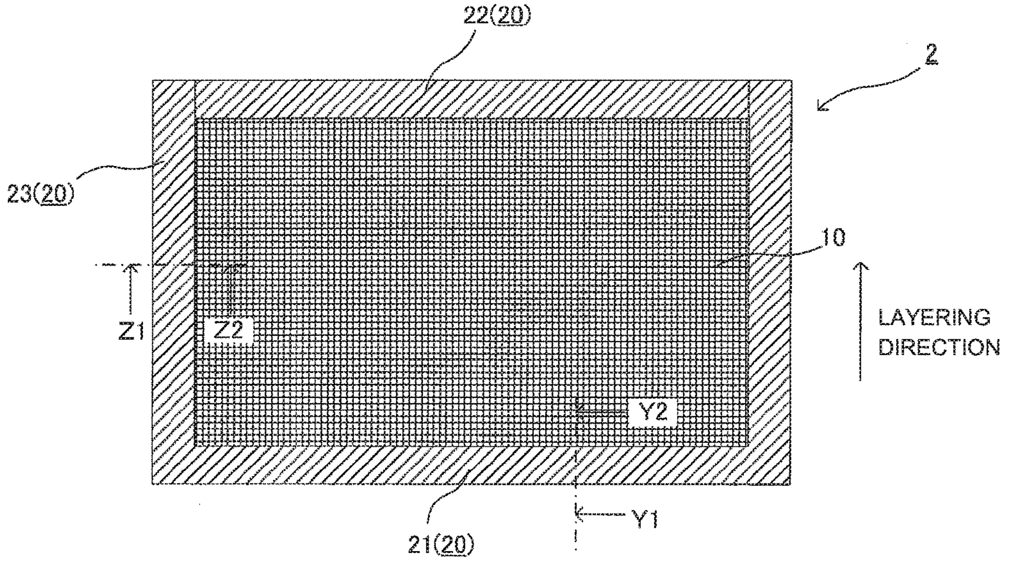
FIG. 2 is a front view of a catalyst block.
Figure 3:
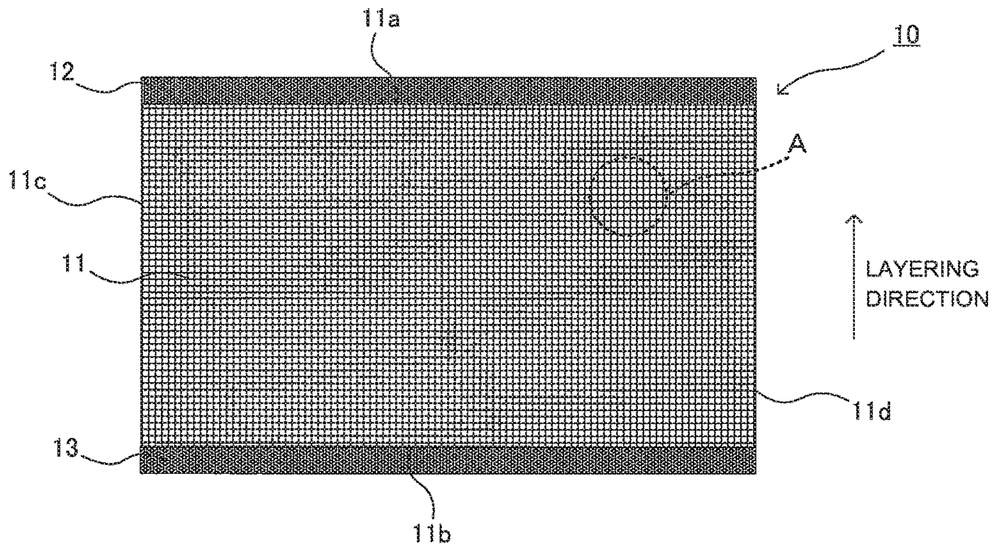
FIG. 3 is a front view of a rigid honeycomb core.
Figure 4:
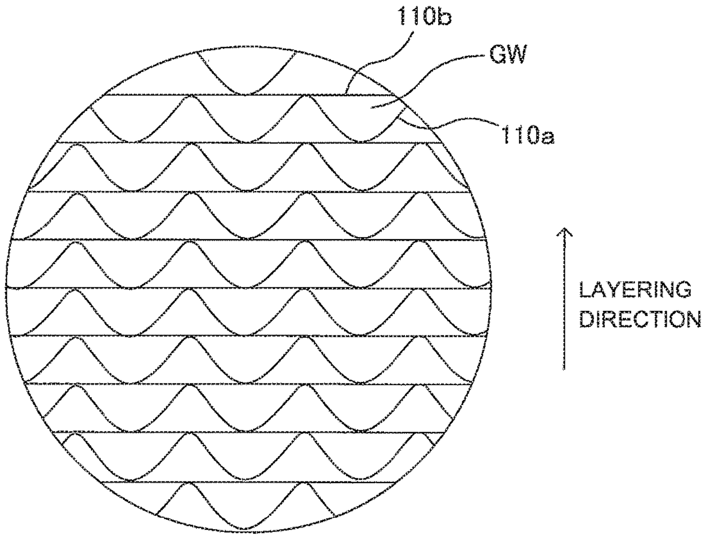
FIG. 4 is an enlarged view in a part of a honeycomb core.
Figure 5:
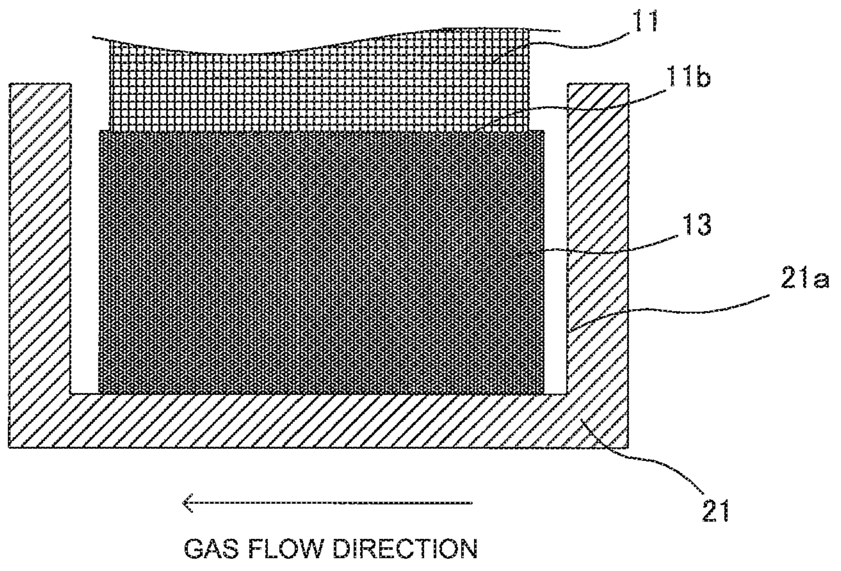
FIG. 5 is a cross-sectional view in a part of the catalyst block (Y1-Y2 cross section).
Figure 6:
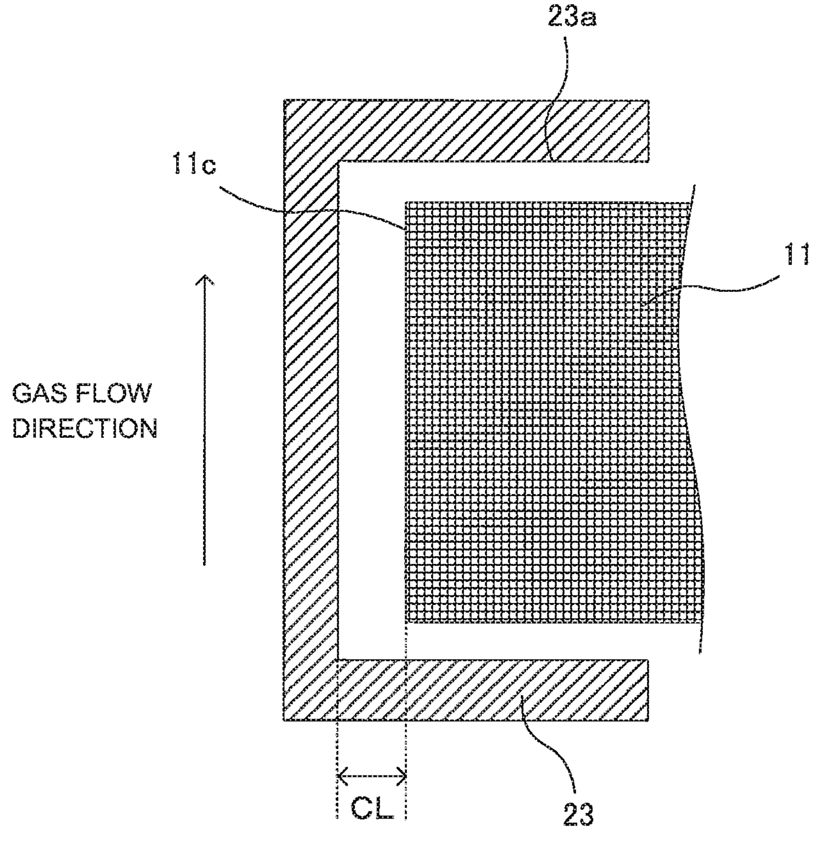
FIG. 6 is a cross-sectional view in a part of the catalyst block (Z1-Z2 cross section).

FIG. 2 is a front view of the catalyst block. The normal direction of the sheet surface corresponds to the gas flow direction. A layering direction shown by an arrow corresponds to a layering direction of a corrugated plate and a flat plate that constitutes a honeycomb core. FIG. 3 is a front view of a rigid honeycomb core contained in the catalyst block. The normal direction of the sheet surface corresponds to the gas flow direction. FIG. 4 is an enlarged view in a part of the honeycomb core, in which a region A in FIG. 3 surrounded in a circle by a dotted line is enlarged. FIG. 5 is a cross-sectional view in a part of the catalyst block cut along Y1-Y2 in FIG. 2. FIG. 6 is a cross-sectional view in a part of the catalyst block cut along Z1-Z2 in FIG. 2.

With reference to FIG. 2, the catalyst block 2 includes a rigid honeycomb core 10 and an outer frame 20 holding the rigid honeycomb core 10. The outer frame 20 has a C-shaped cross section, and is disposed along the outer surface of the rigid honeycomb core 10 in a direction orthogonal to the gas flow direction. Specifically, in the outer frame 20, a concave part is formed. When an outer edge of the rigid honeycomb core 10 is housed in the concave part, the rigid honeycomb core 10 is held by the outer frame 20. For the sake of convenience, the lower side, upper side, and side of the outer frame 20 are referred to as a bottom frame 21, a top frame 22, and a side frame 23, respectively. The bottom frame 21 and the side frame 23 are integrally formed. The top frame 22 is detachably attached to an end part of the side frame 23.

With reference to FIG. 3, the rigid honeycomb core 10 includes a honeycomb core 11, a first plate 12, and a second plate 13. With reference to FIGS. 3 and 4, the honeycomb core 11 is configured so that a corrugated plate 110*a* and a flat plate 110*b* are alternately layered in a layering direction, and a large number of exhaust gas passages GW are formed between the corrugated plate 110*a* and the flat plate 110*b* that are adjacent in the layering direction. The adjacent corrugated plate 110*a* and flat plate 110*b* are fixed with a brazing material. On the corrugated plate 110*a* and the flat plate 110*b*, a catalyst is carried. The corrugated plate 110*a* and the flat plate 110*b* are formed from a metal foil. For the metal foil, various types of heat-resistant stainless steel containing Al can be used. Since the thickness of the metal foil is very small, the structure of the honeycomb core 11 is fragile.

The honeycomb core 11 is formed in a rectangular shape (rectangular parallelepiped shape). For the sake of convenience of description, outer surfaces of the honeycomb core 11 facing in the layering direction are referred to as a first outer surface 11*a* and a second outer surface 11*b*. Outer surfaces of the honeycomb core 11 facing in a direction orthogonal to the layering direction are referred to as a third outer surface 11*c* and a fourth outer surface 11*d*. The first outer surface 11*a* and the second outer surface 11*b* are approximately parallel to each other, and the third outer surface 11*c* and the fourth outer surface 11*d* are approximately parallel to each other. The first outer surface 11*a* forms an approximately right angle with the third outer surface 11*c* and the fourth outer surface 11*d*. The second outer surface 11*b* forms an approximately right angle with the third outer surface 11*c* and the fourth outer surface 11*d*. The layering direction of the corrugated plate 110*a* and the flat plate 110*b* corresponds to a direction facing to the first outer surface 11*a* and the second outer surface 11*b*.

A lower end part of the first plate 12 is fixed so as to cover the first outer surface 11*a* of the honeycomb core 11. As means for fixing, a brazing material can be used. The second plate 13 is fixed so as to cover the second outer surface 11*b* of the honeycomb core 11. As the means for fixing, a brazing material can be used.

For the first plate 12 and the second plate 13, a metal (for example, SUS steel sheet) can be used. The SUS steel sheet is preferably a ferrite-based stainless steel sheet having little thermal expansion and capable of adsorbing by magnetic force.

With reference to FIG. 5, a concave part 21*a* is formed in the bottom frame 21. In the concave part 21*a*, the second plate 13 and apart of the honeycomb core 11 are housed. Specifically, the second plate 13 and the part of the honeycomb core 11 are disposed at a position that is overlapped with a wall part of the bottom frame 21 as viewed in the gas flow direction. However, the concave part 21*a* may be configured so that only the second plate 13 is housed in the inside of the concave part 21*a*. As the area of the honeycomb core 11 housed in the concave part 21*a* is smaller, the area of the honeycomb core 11 brought into contact with the exhaust gas is increased. Therefore, the purification performance of the catalyst block 2 can be enhanced.

When in the aforementioned configuration, the rigid honeycomb core 10 is slid and shifted in the gas flow direction by external force, the second plate 13 and the part of the honeycomb core 11 collide with the wall part of the bottom frame 21. At that time, an impact during collision can be absorbed by the second plate 13. Therefore, a load applied to the honeycomb core 11 can be decreased. It is preferable that the width of the second plate 13 in the gas flow direction be larger than the width of the honeycomb core 11 in the gas flow direction. Herein, when the second plate 13 is omitted, only the honeycomb core 11 that is fragile is housed in the concave part 21*a* of the bottom frame 21. Therefore, a load during collision is received by only the honeycomb core 11. According to the rigid honeycomb core 10 of this embodiment, the second plate 13 is housed in the concave part 21*a* of the bottom frame 21. Therefore, a load applied to the honeycomb core 11 during collision can be largely relaxed.

Figure 13:
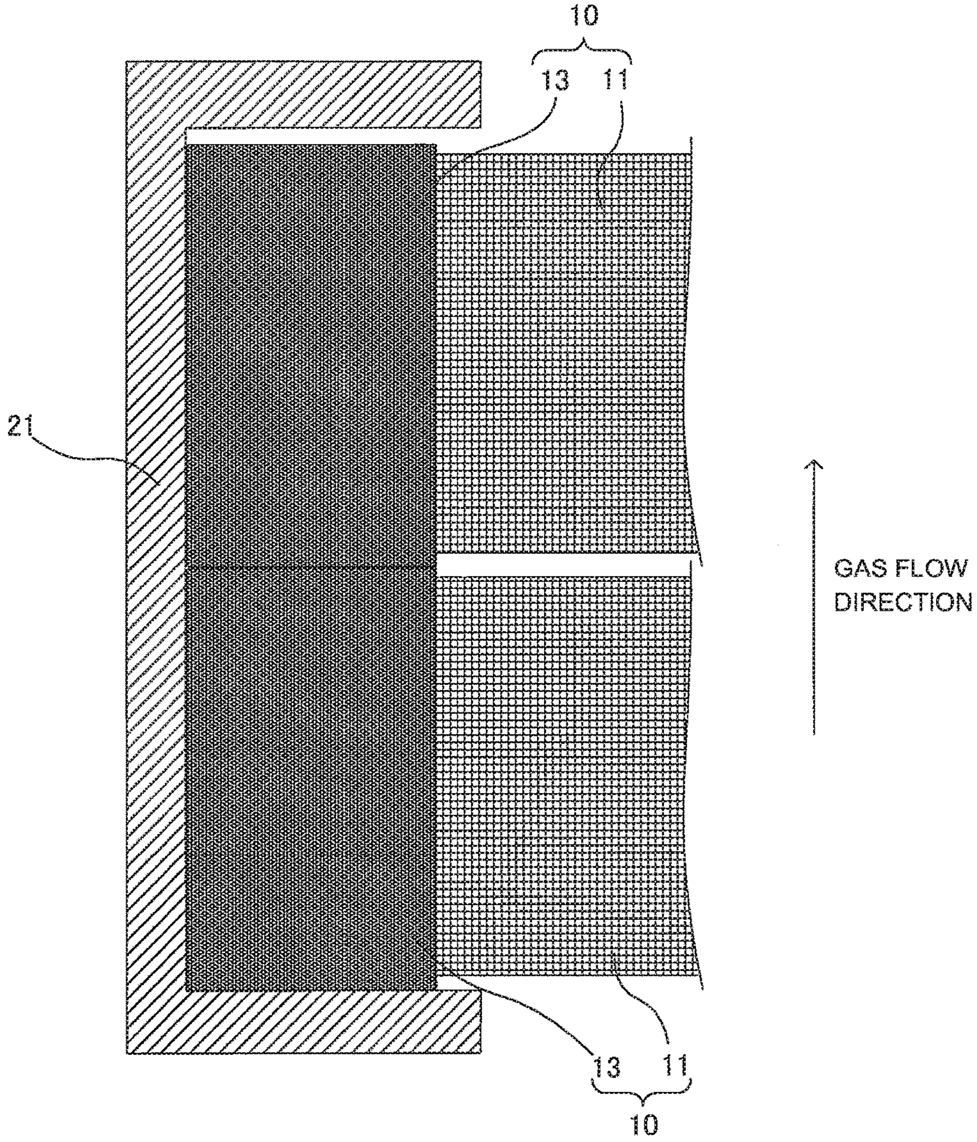
FIG. 13 is a cross-sectional view in a part of the catalyst block in which a rigid honeycomb core is layered into two layers (Y1-Y2 cross section).

When the mechanical strength in the gas flow direction is enhanced, the rigid honeycomb core 10 can be layered vertically with the gas flow direction set to a vertical direction, as shown in FIG. 13. In this case, a larger load is applied to the rigid honeycomb core 10 disposed as a lower layer. However, since the mechanical strength in the gas flow direction is enhanced by the first plate 12 and the second plate 13, the deformation and the like of the honeycomb core 11 can be prevented.

The first plate 12 and a part of the honeycomb core 11 are housed in a concave part (not shown) of the top frame 22. This is the same as that in the case of the second plate 13 described above, and therefore, a description thereof is omitted.

The first plate 12 and the second plate 13 are fixed in the upper and lower end parts, respectively, in the layering direction of the honeycomb core 11, as described above, and reinforced. Therefore, the height of wall of the concave part of the outer frame 20 can be decreased. For this reason, the area of the honeycomb core 11 housed in the inside thereof can be relatively increased as compared with a conventional product. Accordingly, in order to increase the area of the honeycomb core 11 to be brought into contact with exhaust gas, the pressure loss (increase in back pressure) of the catalyst block 2 can be suppressed and the purification performance can be enhanced.

With reference to FIG. 6, the third outer surface 11*c* of the honeycomb core 11 is housed in a concave part 23*a* of the side frame 23. The clearance CL is formed in a direction orthogonal to the gas flow direction between the side frame 23 and the third outer surface 11*c* of the honeycomb core 11. Sliding and shifting of the rigid honeycomb core 10 in the gas flow direction due to external force can be prevented by the first plate 12 and the second plate 13. Therefore, a reinforcement plate is not required for the third outer surface 11*c* and the fourth outer surface 11*d* of the honeycomb core 11. By formation of the clearance CL, dimension error during manufacturing of each rigid honeycomb core 10 inserted into the outer frame 20 can be absorbed. Therefore, the formed clearance CL is advantageous. The fourth outer surface 11*d* of the honeycomb core 11 is also housed in the concave part 23*a* of the side frame 23. However, this is the same as the case of the third outer surface 11*c*, and therefore, the detail description thereof is omitted.

It is preferable that the rigid honeycomb core 10 be fixed through the first plate 12 to the top frame 22 of the outer frame 20 and another part be not fixed. Specifically, the rigid honeycomb core 10 is fixed to only the top frame 22, and not fixed to the bottom frame 21 and the side frame 23. When the rigid honeycomb core 10 is used especially in an environment where the temperature cycle of repeating increase and decrease in temperature is severe, thermal expansion and shrinkage are repeated in the honeycomb core 11 itself. When the first plate 12 and the second plate 13 are fixed to the top frame 22 and the bottom frame 21, respectively, both end surfaces in the layering direction of the honeycomb core 11 are restrained. Therefore, the rigid honeycomb core 10 may be deformed into an abnormal shape or broken by expansion and shrinkage due to the temperature cycle. A method for fixing the top frame 22 and the first plate 12 is preferably a fixation method in which detachment is easy, such as bolting and spot welding.

According to the configuration of this embodiment, the rigid honeycomb core 10 is fixed to only the top frame 22. Therefore, the thermal expansion and shrinkage due to the temperature variation of the rigid honeycomb core 10 can be allowed using the clearance formed between the outer frame 20 and the honeycomb core 10. Thus, the deformation of the rigid honeycomb core 10 into an abnormal shape or breakage can be suppressed.

In a simple fixation method in which a fixing part of the rigid honeycomb core 10 is only on a side of the top frame 22, the rigid honeycomb core 10 may be likely to shift in the gas flow direction. However, even when the rigid honeycomb core 10 shifts, the first plate 12 and the second plate 13 can be strongly fixed with the honeycomb core 11, as described above. Shifting of the first plate 12 can be prevented by a wall of the concave part of the top frame 22, and shifting of the second plate 13 can be prevented by a wall of the concave part of the bottom frame 21. Therefore, the rigid honeycomb core 10 cannot be dropped from the outer frame 20, and defects such as crush of the honeycomb core 11 can be unlikely to occur.

The top frame 22 is detached from the side frame 23, and the top frame 22 and the rigid honeycomb core 10 that are integrated are pulled out from the outer frame 20. Thus, the catalyst block 2 can be maintained (for example, the catalyst is regenerated or reapplied or a novel honeycomb core is exchanged) . Herein, when the outer frame 20 is configured by connection of a plurality of frame members by welding, the rigid honeycomb core 10 cannot be pulled out from the outer frame 20 without cutting of welded parts by a grinder. According to the configuration of this embodiment, an operation of cutting the welded parts by a grinder is unnecessary, and an operation for maintenance is easy.

As shown in FIG. 6, the sufficient clearance CL is formed between the side frame 23 and the rigid honeycomb core 10. Therefore, when the rigid honeycomb core 10 is slid and shifted in the longitudinal direction of the frame along the side frame 23, the rigid honeycomb core 10 can be simply pulled out from the outer frame 20.

The maintenance is performed by immersing the top frame 22 and the rigid honeycomb core 10 that are detached from the outer frame 20 in a catalyst bath. However, the top frame 22 and the rigid honeycomb core 10 are closely fixed without formation of a large clearance CL similar to the clearance formed between the side frame 23 and the rigid honeycomb core 10. The amount of catalyst to be attached to the top frame 22 during immersion in the catalyst bath can be decreased. It is preferable that simple fixation between the top frame 22 and the rigid honeycomb core 10 be removed, and only the rigid honeycomb core 10 be immersed in the catalyst bath, sintered, and simply fixed to the top frame 22 again. Thus, use of unnecessary catalyst can be completely prevented.

When the maintenance is impossible due to large damage of the honeycomb core 11, it is necessary that one group of the top frame 22 and the rigid honeycomb core 10 be exchanged into a new group, or the simple fixation between the top frame 22 and the rigid honeycomb core 10 be removed, and only the rigid honeycomb core 10 be exchanged. However, the bottom frame 21 and the side frame 23, and in some cases, the top frame 22 can be reused. Therefore, the cost can be largely decreased as compared with a case where the whole catalyst block 2 is exchanged.

According to the configuration of this embodiment, the catalyst is not carried on the outer frame 20. Therefore, it is not necessary that a drain hole of discharging the catalyst during the immersion in the catalyst bath be formed in the outer frame 20, unlike the conventional catalyst block. This is due to a method for manufacturing the catalyst block 2 of this embodiment, and the details will be described below.

Figure 7:
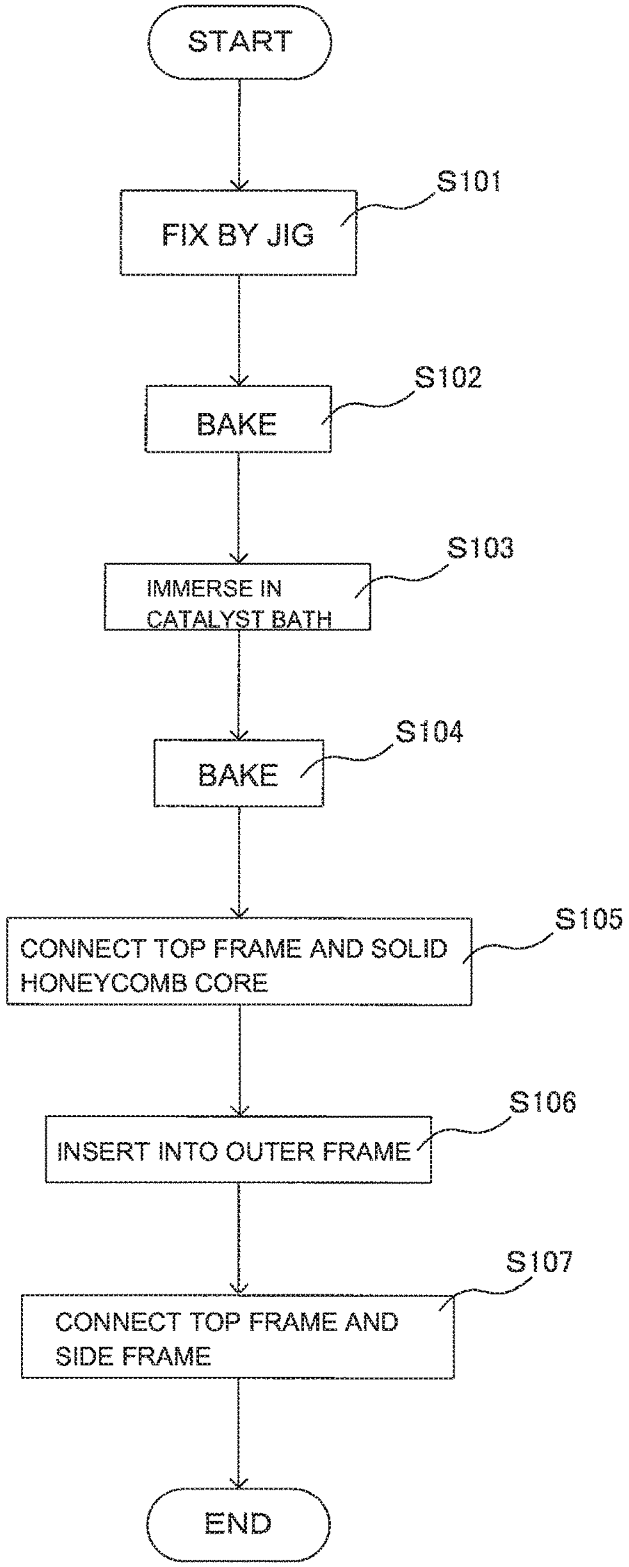
FIG. 7 is a flowchart illustrating a method for manufacturing the catalyst block.
Figure 8:
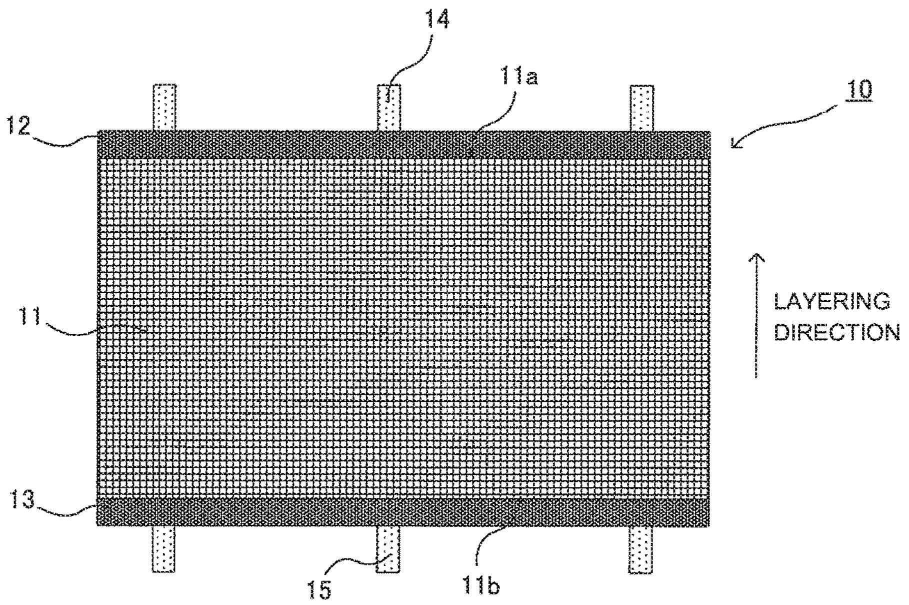
FIG. 8 is a view illustrating a baking step during fixing of a first plate and a second plate with a brazing material.
Figure 9:
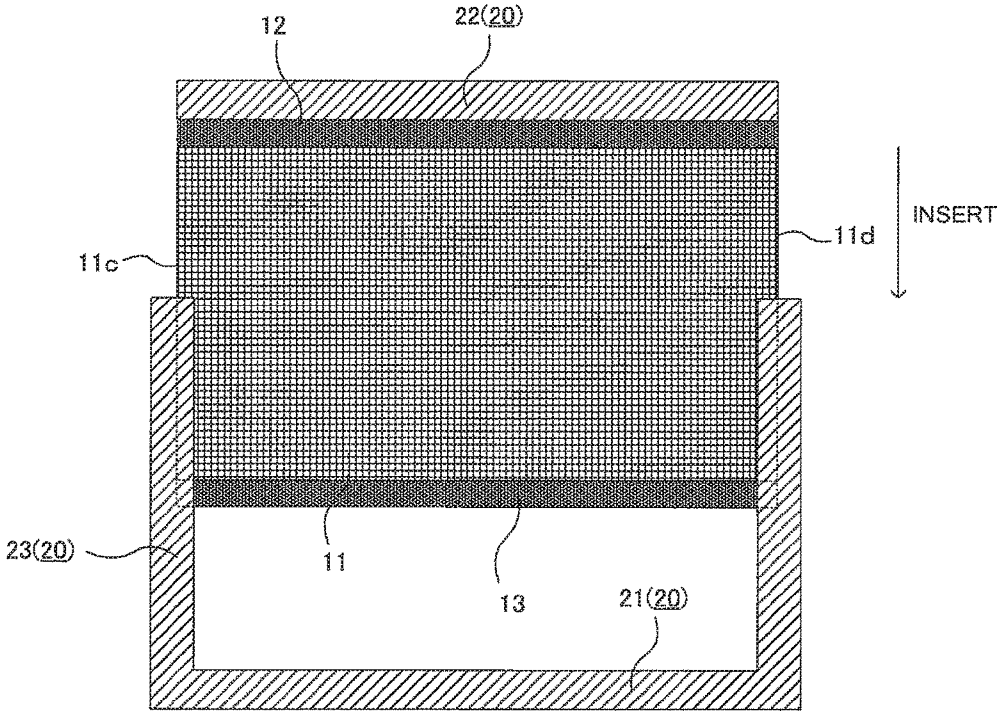
FIG. 9 is a view illustrating an inserting step of inserting the rigid honeycomb core into an outer frame.

Next, the method for manufacturing the catalyst block 2 will be described in detail with reference to FIGS. 7, 8, and 9. FIG. 7 is a flow chart illustrating the method for manufacturing the catalyst block. FIG. 8 is a view illustrating a baking step during fixing the first plate and the second plate with a brazing material. FIG. 9 is a view illustrating a step of inserting the rigid honeycomb core into the outer frame.

In Step S101, a brazing material is applied in advance to both or one of the corrugated plate 110*a* and the flat plate 110*b*, and a sample of the honeycomb core 11 in which the corrugated plate 110*a* and the flat plate 110*b* are alternately layered in the layering direction is produced. The first plate 12 and the second plate 13 are disposed on the first outer surface 11*a* and the second outer surface 11*b*, respectively, of the honeycomb core 11, and a first jig 14 and a second jig 15 are pressed on the first plate 12 and the second plate 13, respectively. Thus, the honeycomb core 11 is held between the jigs through the first plate 12 and the second plate 13 in the layering direction, uniformly pressurized, and fixed (corresponding to a fixation step). The number of the first jig 14 may be one or more. When a plurality of first jigs 14 are used, the pressure applied to the honeycomb core 11 can be increased, or the variation can be decreased even under the same pressure. The same can be applied to the second jig 15.

In Step S102, the honeycomb core 11 held and pressurized between the first plate 12 and the second plate 13 is baked (corresponding to a first baking step). For example, the baking temperature can be set to about 1,200° C. The corrugated plate 110*a* and the flat plate 110*b* that are adjacent to each other are fixed with the brazing material, and the first plate 12 and the second plate 13 are fixed to the honeycomb core 11 with the brazing material. Thus, the rigid honeycomb core 10 having high rigidity and including the first plate 12, the second plate 13, and the honeycomb core 11 is manufactured.

Herein, a method in which the honeycomb core 11 is directly held between the first jig 14 and the second jig 15 without the first plate 12 and the second plate 13, and baked is also considered. However, in this method, a pressure is transferred to only parts where the jigs exist and a pressure is not applied to other parts. This is because a metal foil forming the honeycomb core 11 has considerably small thickness and no rigidity. Thus, a state where the corrugated plate 110*a* and the flat plate 110*b* are fixed by brazing is instable, and the corrugated plate 110*a* and the flat plate 110*b* are not partially connected, forming a gap. Even when the number of the first jig 14 and the second jig 15 is increased to decrease the variation in pressure, a difference in pressure between the parts where the jigs exist and the parts where the jigs do not exist is not cancelled. The state where the corrugated plate 110*a* and the flat plate 110*b* are fixed by brazing remains instable, and the gap is not cancelled.

On the other hand, when the honeycomb core 11 is held between the first plate 12 and the second plate 13, the honeycomb core 11 can be baked while the variation in surface pressure applied to the honeycomb core 11 is suppressed. As a result, the corrugated plate 110*a* and the flat plate 110*b* are not partially connected, and a trouble such as formation of the gap can be prevented.

In Step S103, the first jig 14 and the second jig 15 are detached, and the rigid honeycomb core 10 is transported to a catalyst bath not shown and immersed in the catalyst bath. As a catalyst, a solution containing γ alumina, an additive, and a precious metal catalyst as components can be used. Herein, the structure of the rigid honeycomb core 10 is enhanced by connecting the first plate 12 and the second plate 13. Therefore, a trouble such as distortion of the honeycomb core can be unlikely to occur during operation of immersion in the catalyst bath and transport. Specifically, when the structure of the honeycomb core 11 is enhanced by connecting the first plate 12 and the second plate 13, the immersion workability and the handleability can be enhanced.

When the first plate 12 and the second plate 13 are formed from a ferrite-based stainless, the rigid honeycomb core 10 can be grasped by adsorbing the first plate 12 and the second plate 13 by magnetic force. Thus, the rigid honeycomb core 10 can be adsorbed by a magnet and transported to the catalyst bath.

Therefore, a load applied to the honeycomb core 11 can be further decreased.

In Step S104, the rigid honeycomb core 10 to which the catalyst is attached is baked again (corresponding to a second baking step). For example, the baking temperature can be set to about 600° C. Thus, the catalyst is carried on the rigid honeycomb core 10. In Step S105, the rigid honeycomb core 10 and the top frame 22 are connected. For a connection method, bolting or spot welding can be used. In Step S106, the rigid honeycomb core 10 and the top frame 22 that are integrated is inserted from an opening side of the side frame 23 as shown in FIG. 9. The first plate 12, the second plate 13, the third outer surface 11*c*, and the fourth outer surface 11*d* of the rigid honeycomb core 10 are covered with the outer frame 20. In Step S107, the top frame 22 and the side frame 23 are connected by a bolt using an L-shaped bracket not shown.

According to the manufacturing method of this embodiment, the rigid honeycomb core 10 is baked before the rigid honeycomb core 10 is housed in the outer frame 20 as described above. Therefore, the outer frame 20 is not thermally deformed by exposure to heat during baking. Accordingly, the outer surface of the outer frame 20 is kept flat. For this reason, when the catalyst blocks 2 are spread as shown in FIG. 1, a gap through which exhaust gas that has not been purified flows out is unlikely to be formed between the adjacent catalyst blocks 2. As a result, the denitration effect of the denitration device can be enhanced.

Second Embodiment

Figure 10:
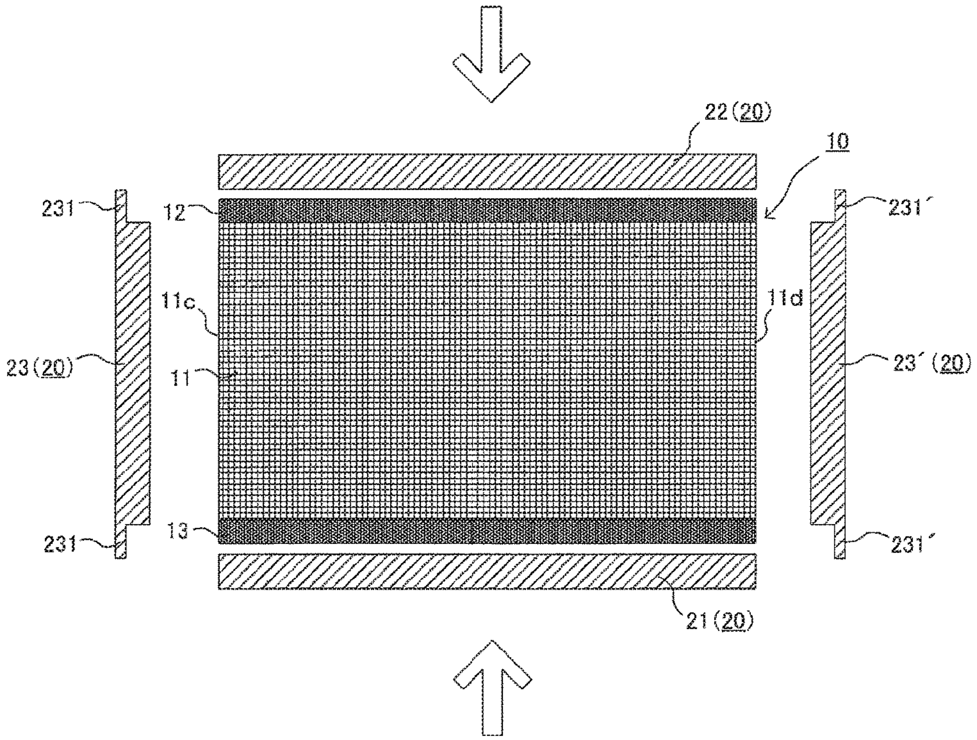
FIG. 10 is an assembly view of a catalyst block of a second embodiment.
Figure 11:
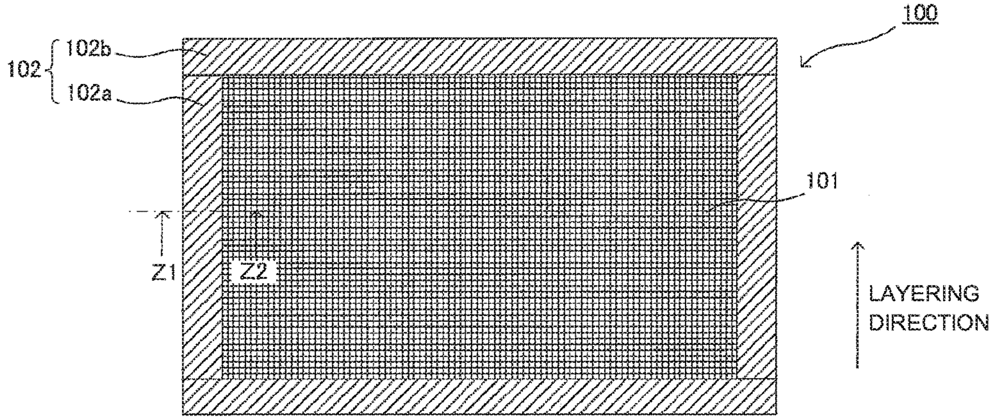
FIG. 11 is a schematic view of a conventional catalyst block.
Figure 12:
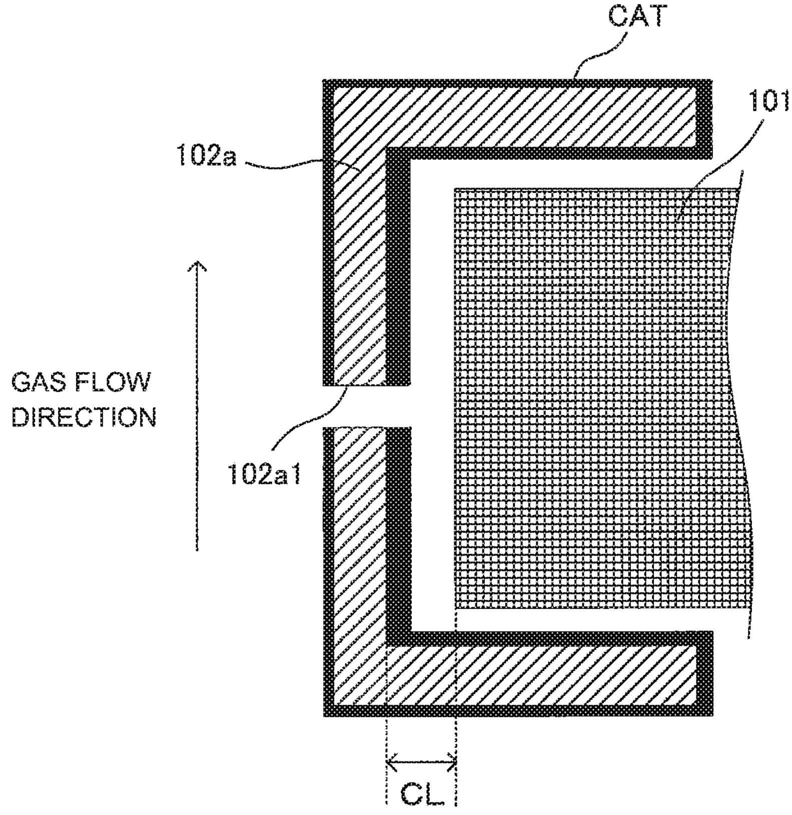
FIG. 12 is a cross-sectional view in a part of the conventional catalyst block (Z1-Z2 cross section).

With reference to FIG. 10, a second embodiment of the present invention will be described. Members having functions common to those in the first embodiment are referred to by the same symbols. The outer frame 20 of this embodiment includes the bottom frame 21, the top frame 22, the side frame 23, and a side frame 23', and the frames 21 to 23' are separately configured.

The top frame 22 is disposed along the first plate 12, the bottom frame 21 is disposed along the second plate 13, the side frame 23 is disposed along the third outer surface 11*c* of the honeycomb core 11, and the side frame 23' is disposed along the fourth outer surface 11*d* of the honeycomb core 11. On both end parts of the side frame 23, a flange connection part 231 is formed. On both end parts of the side frame 23', a flange connection part 231' is formed.

In the aforementioned configuration, the flange connection parts 231 and 231' are welded to the top frame 22 and the bottom frame 21 while the rigid honeycomb core 10 is held and pressurized between the top frame 22 and the bottom frame 21. Thus, the outer frame 20 is formed. Since a welded part is restricted to the end parts of the side frames 231 and 231', distortion of the outer frame 20 due to heat during welding can be suppressed.

The rigid honeycomb core 10 and the outer frame 20 are not at all connected. Therefore, expansion and shrinkage due to the temperature cycle of the rigid honeycomb core 10 are not prevented by the connection parts. However, any one of the first plate 12 and the second plate 13 may be connected to the outer frame 20, like the first embodiment.

Modification 1

In the aforementioned embodiment, the honeycomb core 11 is configured by alternately layering the corrugated plate 110*a* and the flat plate 110*b*. However, the present invention is not limited to this embodiment. For example, the honeycomb core 11 may be configured by layering only the corrugated plate 110*a* in a predetermined direction. In this case, the strength of the honeycomb core 11 may be secured by fitting the corrugated plate 110*a* adjacent in the layering direction to a concave part of another corrugated plate 110*a*.

Modification 2

In the aforementioned embodiment, the first plate 12 and the second plate 13 are disposed on both end parts in the layering direction of the honeycomb core 11. However, the present invention is not limited to this embodiment. The first plate 12 and the second plate 13 may be disposed on an end surface in a direction orthogonal to the layering direction of the honeycomb core 11.

The invention claimed is:

1. A catalyst block for purification of exhaust gas comprising:

a rigid rectangular honeycomb core having a large number of exhaust gas passages for the honeycomb core allowing exhaust gas to pass, first and second outer surfaces that face to each other in an orthogonal direction that is orthogonal to the exhaust gas passages, and third and fourth outer surfaces that face to each other in the orthogonal direction;

a first plate attached to the first outer surface;

a second plate attached to the second outer surface; and an outer frame that is disposed along an outer periphery of the honeycomb core, the first plate, and the second plate, and includes a concave part housing at least the first plate, the second plate, the third outer surface, and the fourth outer surface, wherein a catalyst is carried on the honeycomb core, the first plate, and the second plate, and the catalyst is not carried on the outer frame, wherein the first plate is only fixed to the outer frame in the concave port and the second plate, third outer surface and the fourth outer surface are not fixed to the outer frame in the concave part.

2. The catalyst block according to claim 1, wherein the first plate is fixed in the concave part of the outer frame, and the second plate, the third outer surface, and the fourth outer surface are not fixed in the concave part of the outer frame.

3. The catalyst block according to claim 2, wherein the outer frame includes a bottom frame and a side frame that are integrally formed, and a top frame attached to the side frame, the first plate is housed in the concave part of the top frame, the second plate is housed in the concave part of the bottom frame, and the third outer surface and the fourth outer surface are housed in the concave part of the side frame.

4. The catalyst block according to claim 3, wherein the honeycomb core is configured by alternately layering a flat foil and a corrugated foil in a direction in which the first outer surface and the second outer surface face to each other.

5. The catalyst block according to claim 4, wherein the first plate and the second plate are formed from a ferrite-based stainless.

6. The catalyst block according to claim 2, wherein the first plate and the second plate are formed from a ferrite-based stainless.

7. The catalyst block according to claim 3, wherein the first plate and the second plate are formed from a ferrite-based stainless.

8. The catalyst block according to claim 2, wherein the honeycomb core is configured by alternately layering a flat foil and a corrugated foil in a direction in which the first outer surface and the second outer surface face to each other.

9. The catalyst block according to claim 8, wherein the first plate and the second plate are formed from a ferrite-based stainless.

10. The catalyst block according to claim 1, wherein the outer frame includes a bottom frame and a side frame that are integrally formed, and a top frame attached to the side frame, the first plate is housed in the concave part of the top frame, the second plate is housed in the concave part of the bottom frame, and the third outer surface and the fourth outer surface are housed in the concave part of the side frame.

11. The catalyst block according to claim 10, wherein the honeycomb core is configured by alternately layering a flat foil and a corrugated foil in a direction in which the first outer surface and the second outer surface face to each other.

12. The catalyst block according to claim 11, wherein the first plate and the second plate are formed from a ferrite-based stainless.

13. The catalyst block according to claim 10, wherein the first plate and the second plate are formed from a ferrite-based stainless.

14. The catalyst block according to claim 1, wherein the honeycomb core is configured by alternately layering a flat foil and a corrugated foil in a direction in which the first outer surface and the second outer surface face to each other.

15. The catalyst block according to claim 14, wherein the first plate and the second plate are formed from a ferrite-based stainless.

16. The catalyst block according to claim 1, wherein the first plate and the second plate are formed from a ferrite-based stainless.

* * * * *